(12) United States Patent
Hull et al.

(10) Patent No.: US 9,309,685 B1
(45) Date of Patent: Apr. 12, 2016

(54) CLEANING TOOL FOR POOL SKIMMER BASKET

(71) Applicants: David Henry Hull, Irondale, MO (US); Jacqueline Kay Hull, Irondale, MO (US)

(72) Inventors: David Henry Hull, Irondale, MO (US); Jacqueline Kay Hull, Irondale, MO (US)

( * ) Notice: Subject to any disclaimer, the term of this patent is extended or adjusted under 35 U.S.C. 154(b) by 0 days.

(21) Appl. No.: 14/713,022

(22) Filed: May 15, 2015

Related U.S. Application Data

(60) Provisional application No. 62/000,276, filed on May 19, 2014.

(51) Int. Cl.
*E04H 4/16* (2006.01)
*B25J 1/04* (2006.01)

(52) U.S. Cl.
CPC *E04H 4/1609* (2013.01); *B25J 1/04* (2013.01)

(58) Field of Classification Search
CPC ............... B25J 1/02; B25J 1/04; E04H 4/16; E04H 4/1609
USPC ............................ 294/24, 175, 191, 209, 158
See application file for complete search history.

(56) References Cited

U.S. PATENT DOCUMENTS

| | | | |
|---|---|---|---|
| 192,879 A * | 7/1877 | Rutherford et al. | 294/22 |
| 3,146,015 A * | 8/1964 | Roberge | 294/104 |
| 3,669,487 A * | 6/1972 | Roberts et al. | 294/104 |
| 3,733,098 A | 5/1973 | Tobias | |
| 4,160,563 A * | 7/1979 | Whitney | 294/104 |
| 4,515,023 A * | 5/1985 | Kershner | 73/864.51 |
| 5,072,538 A | 12/1991 | Hendricks | |
| 5,342,513 A | 8/1994 | Wall | |
| 6,257,634 B1 | 7/2001 | Wei | |
| 6,422,623 B1 | 7/2002 | Thomas | |
| 6,592,756 B1 | 7/2003 | Felix, Jr. | |
| 7,309,088 B2 * | 12/2007 | Fiore et al. | 294/24 |
| 7,665,782 B2 | 2/2010 | Buzby | |
| 7,934,756 B2 | 5/2011 | Kroeze | |
| 8,029,035 B1 * | 10/2011 | Bottner | 294/104 |
| 8,042,849 B2 | 10/2011 | Pratt | |
| 8,047,589 B1 * | 11/2011 | Trainor | 294/24 |
| 8,091,934 B2 * | 1/2012 | Bair | 294/24 |
| 8,430,438 B2 * | 4/2013 | Murphy | 294/26 |
| 2014/0015267 A1 | 1/2014 | Smith | |
| 2014/0327257 A1 | 11/2014 | Vazquez | |

* cited by examiner

*Primary Examiner* — Dean Kramer
(74) *Attorney, Agent, or Firm* — CreatiVenture Law, LLC; Dennis J M Donahue, III

(57) ABSTRACT

A cleaning tool for a pool skimmer basket has a handle with a grip and a lever, a tube that extends from the handle to a pivot assembly at its distal end, and a rod within the tube that connects the actuator to the pivot assembly. The pivot assembly is inserted into a basket fitting and is rotated about the longitudinal axis to secure the skimmer basket to the cleaning tool. The skimmer basket is then lifted out of its housing and the lever actuates the rod to force the rotation of the pivot assembly. As the pivot assembly moves from its initially aligned arrangement with the tube's longitudinal axis to a position that is askew from the axis, the skimmer basket is rotated so that the debris in the skimmer basket is dumped out.

20 Claims, 3 Drawing Sheets

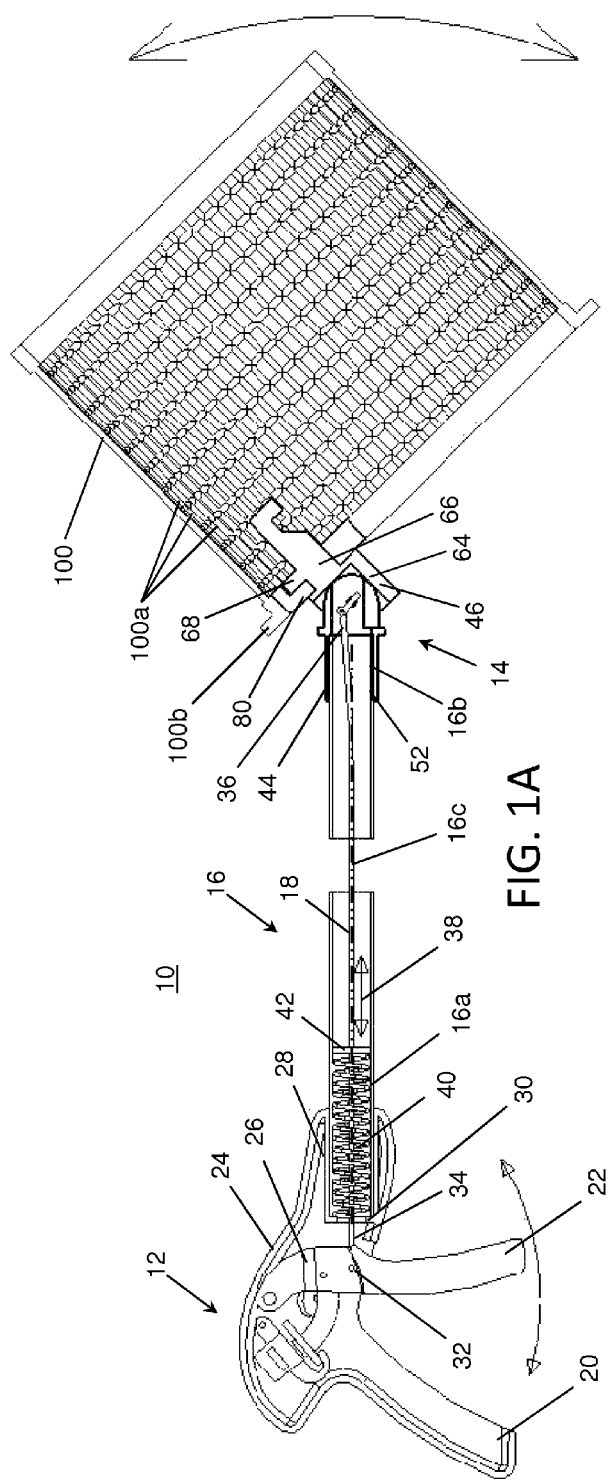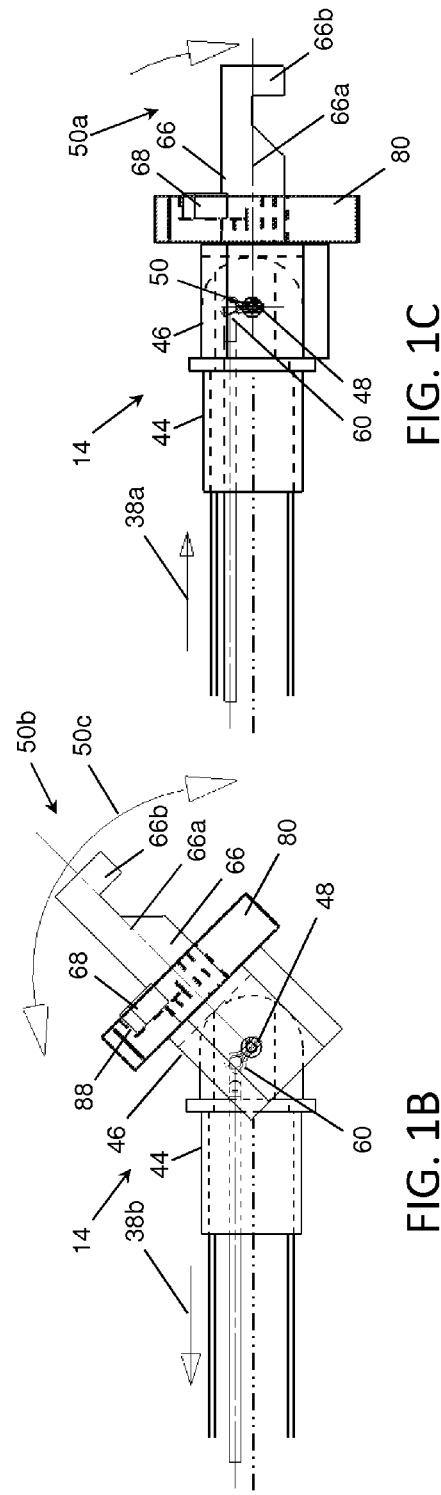

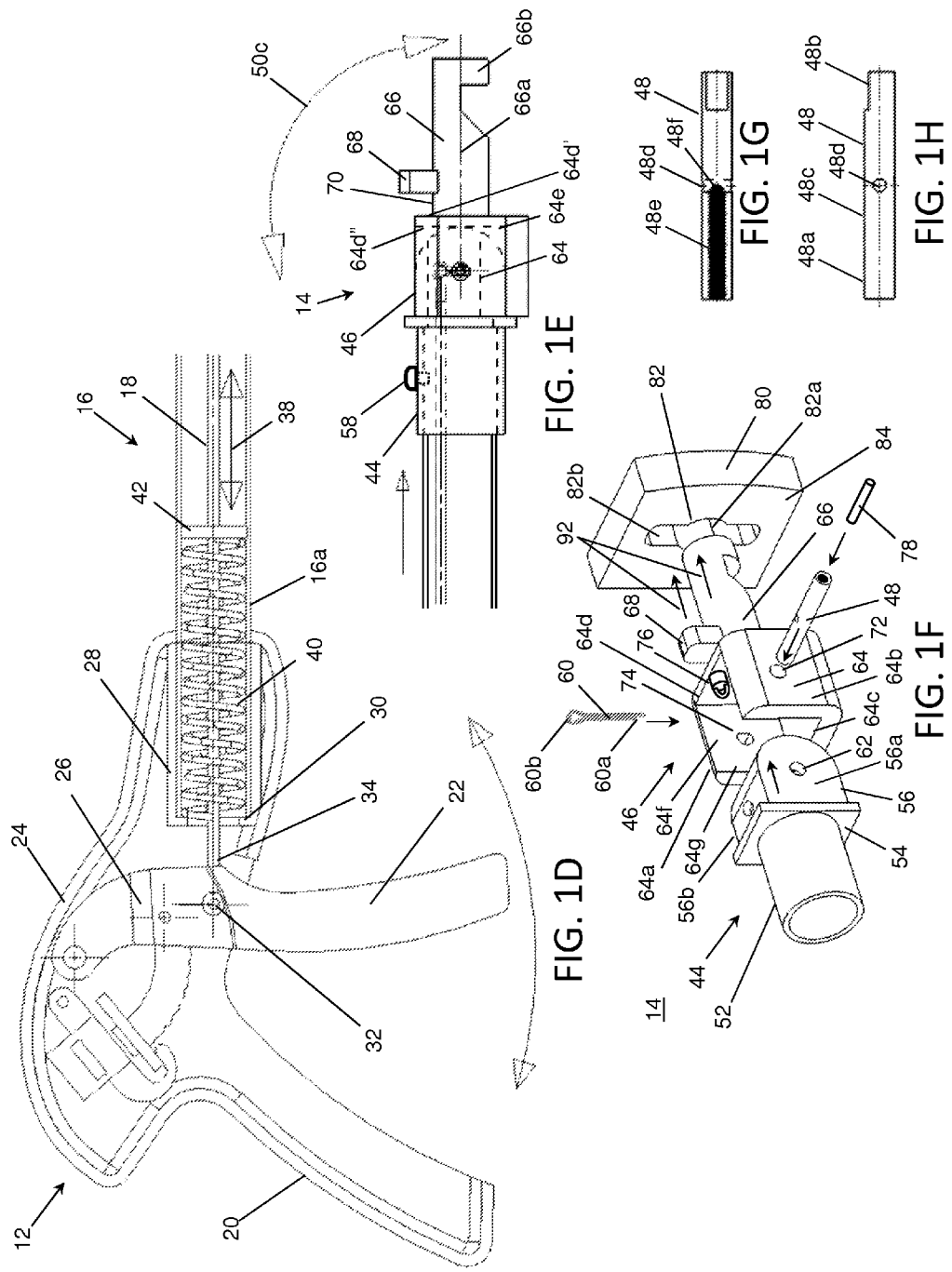

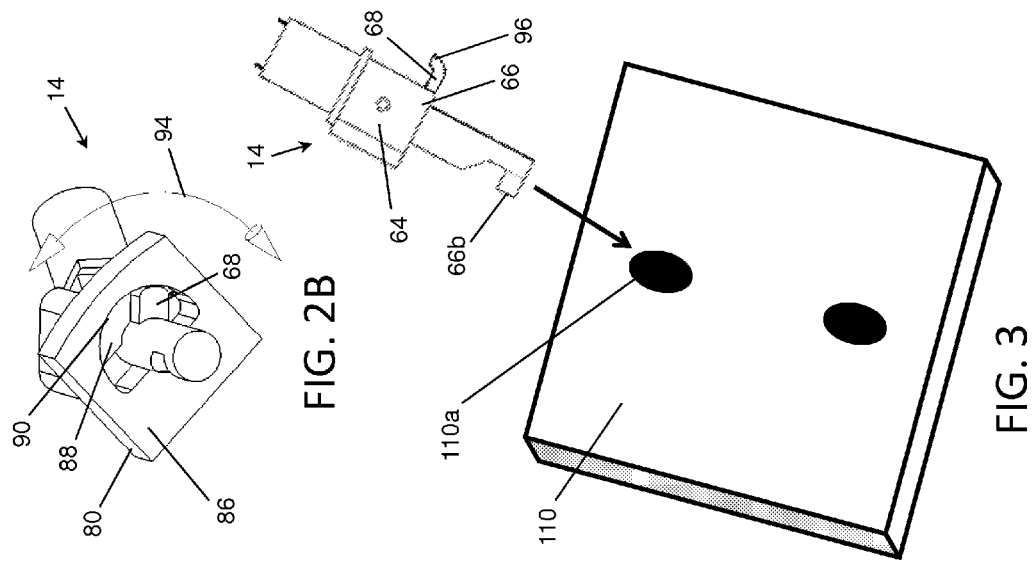
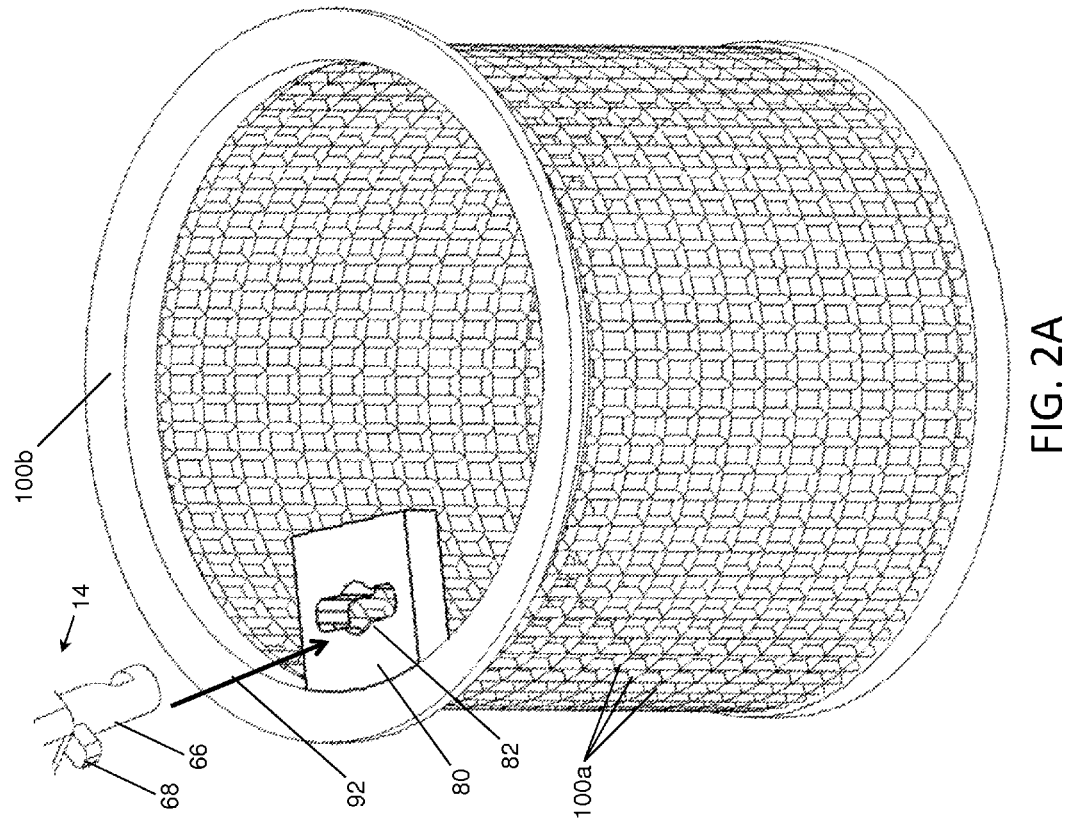
FIG. 2A
FIG. 2B
FIG. 3

CLEANING TOOL FOR POOL SKIMMER BASKET

CROSS-REFERENCE TO RELATED APPLICATIONS

This application claims priority from U.S. Provisional Patent Application No. 62/000,276 filed on May 19, 2014 which is hereby incorporated by reference.

STATEMENT REGARDING FEDERALLY SPONSORED RESEARCH

Not Applicable.

APPENDIX

Not Applicable.

BACKGROUND OF THE INVENTION

1. Field of the Invention

The present invention relates to cleaning tools, and more particularly to a cleaning tool for pool skimmer baskets.

2. Related Art

The skimmer baskets used in swimming pool circulation and filtration systems collect a variety of leaves, creatures and other debris that require regular cleaning. The skimmer baskets must be emptied of the debris and cleaned as a part of the water filtration system to permit the proper operation of the water circulation system. Accordingly, skimmer baskets are designed to be removed from their respective housings so that they can be readily emptied of the debris and cleaned. Removing a skimmer basket from its housing usually requires reaching into the housing and below the pool's water line to grasp a handle on the basket. However, many people dislike reaching into the housing and below the waterline to grasp the handle because it usually results in also touching the debris, and there could be live spiders, bugs or other insects or small animals within the housing.

Several types of handle extensions and cleaning tools have been invented so that people can avoid reaching into the housing and/or below the pool's water line. However, currently known handle extension designs are not acceptable because they still provide a place for live insects and spiders to perch safely above the waterline and it is still necessary to bend down to remove the lid and skimmer basket from the housing and a person must touch the skimmer basket to empty its contents. Additionally, some handle extensions may extend above the skimmer basket which could interfere with the installation of certain types of pool vacuum attachments. Further, some elongated tools may eliminate the need to reach below the water line, allowing the skimmer lid to be removed from the housing cover and the skimmer basket to be removed from the housing receptacle without bending, but these elongated tools still require a person to touch the skimmer basket to empty its contents. Examples of known handle extensions for cleaning tools used for different types of cleaning other than emptying a pool skimmer basket are described U.S. Pat. No. 3,733,098, U.S. Pat. No. 6,257,634, U.S. Pat. No. 7,665,782, and U.S. Pat. No. 7,934,756, and although these inventions would not satisfactorily work for a skimmer basket, their actuating mechanisms may be used with the other operative elements of the present invention; accordingly, these patented inventions are hereby incorporated by reference.

There remains a need for a cleaning tool for a pool skimmer basket which does not interfere with any operation of the pool circulation, filtration and cleaning systems, particularly including the vacuum system, and which also allows a person to empty the contents of the skimmer basket without having to touch the skimmer basket.

SUMMARY OF THE INVENTION

The present invention is a skimmer basket removal and cleaning tool that eliminates the need to reach into the water and also eliminates the need to touch the skimmer basket while emptying it of debris that has accumulated therein. Additionally, the elongated tool handle with the notched and actuated tip eliminates the need to bend down to remove the lid on the skimmer or to remove and replace the skimmer basket and also eliminates the need to come into direct contact or even come close to any part of the skimmer structure, particularly including the skimmer basket.

In one aspect of the invention, the cleaning tool has a handle with a grip and an actuator lever, a tube that extends from the handle to a pivot assembly at its distal end, and a rod within the tube that connects the actuator to the pivot assembly. The pivot assembly is connected to the skimmer basket, such as through a basket fitting, to secure the skimmer basket to the cleaning tool. The skimmer basket is then lifted out of its housing and the actuator operates the rod to force the rotation of the pivot assembly. As the pivot assembly moves from its initially aligned arrangement with the tube's longitudinal axis to a position that is askew from the axis, the skimmer basket is rotated so that the debris in the skimmer basket is dumped out.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings. The drawings constitute a part of this specification and include exemplary embodiments of the invention, which may be embodied in various forms. It is to be understood that in some instances, various aspects of the invention may be shown exaggerated or enlarged to facilitate an understanding of the invention; therefore the drawings are not necessarily to scale. In addition, in the embodiments depicted herein, like reference numerals in the various drawings refer to identical or near identical structural elements.

FIG. 1A is a side cutaway view of the cleaning tool according to the present invention as it is engaged with a skimmer basket.

FIGS. 1B and 1C are detail side cutaway views of the pivot assembly with the basket fitting in a rotated orientation and an aligned orientation, respectively.

FIG. 1D is a detail side cutaway view of the handle.

FIG. 1E is a detail side cutaway view of the pivot assembly.

FIG. 1F is an exploded perspective view of the pivot assembly with the basket fitting.

FIGS. 1G is a cutaway view of the pivot pin used in the pivot assembly.

FIG. 1H is a plan view of the pivot pin.

FIG. 2A is a perspective view of the skimmer basket with a partial view of the pivot assembly.

FIG. 2B is a bottom perspective view of the pivot assembly engaged with the basket fitting.

FIG. 3 is a side view of the pivot assembly shown with a skimmer cover.

DETAILED DESCRIPTION OF THE PREFERRED EMBODIMENTS

The following description of the preferred embodiment(s) is merely exemplary in nature and is in no way intended to limit the invention, its application, or uses. According to the present invention, a cleaning tool 10 has three primary components, an actuating handle 12, a pivot assembly 14, and an elongated tube 16 with an internal rod 18 which connects the handle to the pivot assembly. The cleaning tool 10 is shown in FIG. 1A as it engages a skimmer basket 100 through a basket fitting 80. Each one of these components is described in detail below, followed by a description of the operation of the cleaning tool.

The actuating handle 12 includes a grip 20 and a lever 22. The lever is rotatably connected to the grip housing 24 through a pivot joint 26. The lever has a resting position and an actuated position as shown by the double-headed arrow in FIGS. 1A and 1D. The grip housing can extend beyond the lever to form a cavity 28 in which the proximal end 16a of the tube is held in place. The cavity preferably includes a flange 30 against which the tube is held, and it is also possible to use set screws to lock the tube in place within the handle's cavity. The lever 22 includes a fastener 32, such as a threaded nut or other locking mechanism, to hold one end 34 of the rod 18 to the lever.

The tube 16 extends from its proximal end 16a to a distal end 16b along a longitudinal axis 16c. The rod 18 extends from its connection point 34 at the lever 22 through the flange 30 and the tube 16 to its opposite end 36 where it connects to the pivot assembly 14 as explained in more detail below. As the handle is actuated from its resting position to its actuated position, the rod respectively moves 38 along the longitudinal axis from an extended position 38a to a retracted position 38b which are shown by the double-headed arrow in FIG. 1A and are also shown by the single-headed arrows in FIGS. 1B and 1C. Of course, it will be appreciated that it is also possible for the handle's resting and actuated positions to respectively correspond with retracted and extended positions of the rod by rearranging parts of the invention.

Generally, the rod 18 and lever 22 function together as a linear actuator, and the rod itself functions as part of a linear transmission. The linear transmission also includes a spring 40 and a stop 42. The spring surrounds the rod within the tube at its proximal end, and the stop is crimped or otherwise connected to the rod between its ends to hold the spring against the flange 30 in the handle's cavity at the proximal end of the tube. The spring biases the lever to its resting position.

The pivot assembly 14 includes a tube fitting 44 and a mounting joint 46. The tube fitting is fixedly connected to the tube's distal end without permitting any rotation relative to the tube, and the mounting joint is rotatably connected to the tube fitting, preferably through a pivot pin 48. As shown in FIGS. 1B, 1C and 1E and discussed in further detail below with regards to FIGS. 1F-1H, the pivot pin provides the axis of rotation 50 for the mounting joint to rotate relative to the tube fitting. The mounting joint has one orientation 50a that is aligned with the tube's longitudinal axis and another orientation 50b that is rotated askew from the tube's longitudinal axis. When the rod is in its biased extended position, corresponding with the resting position of the lever, the mounting joint is its aligned orientation 50a, and when the lever forces the rod into its retracted position, the mounting joint is forced to its askew orientation 50b. The pivot assembly also preferably includes a torque clip 60 connected to the pivot pin 48 at one end 60a and connected to the rod at an opposite end 60b. The rod may have an eyelet or a hook at its distal end which connects to an eyelet or hook on the torque clip. Of course, there are many number of fasteners that could be used to rotatably connect the torque clip to the rod.

The tube fitting 44 has a cylindrical section 52, a flange section 54 and an arch section 56. The cylindrical section fits around the tube's distal end 16b, and the flange section is buttressed against the tube's distal end. To prevent rotation of the tube fitting relative to the tube's distal end, a set screw 58 can be placed through the cylindrical section of the tube fitting and into the tube's distal end to lock the components together as shown in FIG. 1E. The arch section has a pair of faceplates 56a, 56b with a circular orifice 62 in each of the faceplates through which the pivot pin extends. The faceplates are located between the sides of the mounting joint as described below.

The mounting joint 46 has a shoulder section 64 that mounts to the pivot pin 48 and a distal arm 66 that longitudinally extends from the shoulder section away from the tube fitting. A tab 68 laterally projects from the distal arm perpendicular to the distal arm's axis 66a, and the distal arm preferably extends beyond the tab to a distal end hook 66b. The tab projects from the mounting joint into a plane 50c perpendicular to the axis of rotation 50, and the tab is substantially perpendicular to the tube's longitudinal axis when the mounting joint is in its aligned orientation 50a. The shoulder section 64 has a pair of opposing sidewalls 64a, 64b, a support wall 64c extending between the opposing sidewalls, an end wall 64d extending between the opposing sidewalls and connected to the support wall along one side 64e, and a pair of open sides 64f, 64g opposite to the support wall and the end wall. The faceplates 56a, 56b are adjacent to the opposing sidewalls 64a, 64b with the orifices in alignment with the holes to permit the pivot pin extending through the orifices and holes.

The distal arm 66 preferably extends from the end wall's exterior side 64d' as shown in FIG. 1E although the distal arm can be formed as a part of the support wall as shown in FIG. 3 or may even be one or more extensions from the sidewalls (not shown). In the embodiment illustrated in FIGS. 1 and 2, the laterally projecting tab 68 is spaced from the end wall by a distance 70, whereas the embodiment illustrated in FIG. 3 shows that one or more tabs 68 can project from the distal arm portion of the support wall without being spaced from the end wall.

As particularly shown in FIG. 1F, one of the sidewalls 64a has a circular hole 72 and another one of the sidewalls has a semicircular hole 74. These different shaped holes correspond with the different shapes at the ends of the pivot pin. As shown in FIGS. 1G and 1H, the pivot pin 48 has a circular end 48a, a semicircular end 48b and a circular center 48c. The semicircular end 48b fits in the semicircular hole 74 in a mating relationship, and the circular end 48a fits in the circular hole 72. Similarly, the circular center 48c fits in the circular orifices 62 in the faceplates 56a, 56b which are aligned with the circular and semicircular holes. Accordingly, when the pivot pin is rotated by the actuation of the rod pulling on the torque clip 60, the semicircular end bears against the semicircular hole to rotate the mounting joint relative to the tube fitting. It will also be appreciated that the rod could alternatively connect to the mounting joint in an offset relationship to the pivot pin rather than being connected to the pivot pin. Accordingly, the rod could connect to a mount 76 on the end wall's interior side 64d" or to the torque clip 60, both of which are shown as alternative connection points for the rod in FIG. 1F.

In the embodiment that uses the torque clip 60 to connect the rod 18 to the pivot pin 48, the pivot pin has a center hole 48*d* and an internal threaded hole 48*e* as particularly shown in FIGS. 1G and 1H. The center hole extends through the torque clip perpendicular to the axis of rotation and the internal threaded hole extends from the pivot pin's circular end 48*a* along the axis of rotation to an intersection 48*f* with the center hole. The torque clip is positioned with one end in the center hole, and a set screw 78 is inserted into the internal threaded hole to engage and hold the torque clip in place at the intersection of the internal threaded hole and the center hole.

In the embodiment in which the mounting joint 46 is designed to engage the basket fitting 80, the basket fitting is connected to the basket with fasteners, such as with bolts, screws, clamps or clips, or the basket fitting may be produced as a part of the basket. The basket fitting has an aperture 82 extending from the top side 84 to a bottom side 86. The bottom side preferably includes a recess 88 that is adjacent to the aperture and defines a semicircular locking section 90 of the basket fitting, and the aperture is has a bore 82*a* and a pair of slots 82*b* on opposite sides of the bore 82*a*. As shown in FIGS. 1F and 2A, the distal arm and laterally extending tab respectively extend through the bore and one of the slots when they are in an aligned orientation 92. As shown in FIG. 2B, when the laterally extending tab has been inserted past the slot and is even with the recess, it is rotated into the recess in a locked orientation 94. With this arrangement, the locking section in the basket fitting is situated between the laterally projecting tab 68 and the end wall of the mounting joint's shoulder section when the tab is in its locked orientation, and the distal arm 66 also engages the bore through which it extends. The diameter of the bore is greater than the width of the slots so that the distal arm cannot slide into one of the slots and is locked within the bore when the tab is in its locked orientation.

With embodiments in which the tabs 68 project from the distal arm portion of the support wall without being spaced from the end wall, the tabs 68 may have a hook extension 96 that can engage the basket grid 100*a* and/or the basket rim 100*b*. Accordingly, it is possible for the cleaning tool 10 of the present invention to connect to skimmer baskets without the use of a separate basket fitting. The basket fitting of the present invention is an advancement over current skimmer baskets because it allows the cleaning tool's mounting joint to securely lock onto the basket while the tool is actuated to rotate the basket. The basket fitting could be modular so that it can connect to a number of different styles, shapes and sizes of skimmer baskets. Of course, it is also possible for the hook extensions or other types of latching mechanisms to connect to different types of skimmer baskets, and the hook extensions could even be modular to fit the particular grid dimensions and shapes used for the various skimmer basket designs.

The pivot assembly is designed to be inserted into the basket fitting and rotated to engage the pivot assembly with the basket fitting and thereby connect the tool to the basket. Since no skimmer basket manufacturer currently produces a basket with a basket fitting for the skimmer basket cleaning tool of the present invention, the present invention describes a basket fitting design which can be connected to the skimmer basket through nuts and screws or other fasteners that are corrosion resistant, rust resistant, such fasteners made from stainless steel, plastic, galvanized metal. As explained above, it is also possible for the pivot assembly to have hooks or other latching mechanisms that connect directly to existing basket designs or to basket handles. Of course, it is also possible for skimmer basket manufacturers to produce baskets with basket fittings that mate with the cleaning tool of the present invention.

In operation, the hook is used to engage an aperture 110*a* in the lid 110 which covers the housing for the skimmer basket so that the lid can be removed from its seating. The operation of the hook is shown in FIG. 3. The pivot assembly connects to the skimmer basket through the mounting joint as described above, either using the basket fitting or directly to the basket. With the tool connected to the skimmer basket, the operator removes the skimmer basket from the housing to let the water drain. The operator pulls the lever to actuate the pivot assembly which rotates with the connected skimmer basket and dumps the debris from the basket without ever having to touch the lid to the skimmer basket housing or the skimmer basket. After the skimmer basket is emptied of the debris, the operator can use the tool to place the skimmer basket back into the housing, disconnect the pivot assembly from the skimmer basket and again use the hook to engage with the aperture in the lid and place the lid back over the top of the housing without touching the skimmer basket or the lid except through the cleaning tool.

To connect the pivot assembly's mounting joint to the basket fitting, the operator inserts the distal arm into the bore with the tab aligned with the adjacent slot so that the tab passes all the way through the slot to the bottom side of the basket fitting. The operator then rotates the tool so that the tab engages the recess in the bottom side of the basket fitting which traps the basket fitting between the tab and the exterior side of the shoulder section's end wall. After the operator pulls the skimmer basket from the housing, empties the basket, and returns the basket to the housing, the operator can then rotate the tool so that the tab is again aligned with the slot so that the tab can be pulled back through the slot and separated from the basket.

When the operator moves the lever from the resting position to its actuated position, the lever translates the rod within the tube along the longitudinal axis from its extended position to a retracted position. The rod pulls on the eyelet which forces the pivot housing to rotate around the pivot pin so that the pivot assembly is askew from the longitudinal axis of the tube. In the preferred embodiment, a spring biases the lever to the resting position.

Accordingly, the tool eliminates the need to reach into the water and also eliminates the need to touch the skimmer basket while emptying it of debris that has accumulated therein. Additionally, the elongated tool handle with the distal end hook and actuated pivot assembly eliminates the need to bend down to remove the lid on the skimmer or to remove and replace the skimmer basket and also eliminates the need to come into direct contact or even come close to any part of the skimmer structure, particularly including the skimmer basket.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, although the embodiments described above and shown in the drawings describe the rod within the tube as a particular type of a linear transmission, technically skilled persons would appreciate that there are a number of devices that could be used in the actuator assembly, such as a Bowden cable actuator with a cable within a sheath such as described in U.S. Pat. No. 609,570 which is incorporated herein by reference. Also, skilled technologists would appreciate that there are many types of linear transmissions or linear actuators that could be used with the present invention, such as rack and pinion designs (toothed bars or rods), roller screw designs (threaded bars) and even simple chain or belt designs. Thus, the breadth and scope of the present invention should not be limited by any of the above-described exemplary embodiments, but should be defined only in accordance with the following claims appended hereto and their equivalents.

What is claimed is:

1. A cleaning tool for a skimmer basket, comprising:
a handle comprising a grip and a lever, wherein said lever has a resting position and an actuated position;
a tube connected to said handle at a proximal end and extending from said proximal end to a distal end along a longitudinal axis;
a pivot assembly comprising a tube fitting and a mounting joint, wherein said tube fitting is fixedly connected to said distal end of said tube, wherein said mounting joint is rotatably connected to said tube fitting, wherein said mounting joint is comprised of a shoulder section and a distal arm longitudinally extending from said shoulder section away from said tube fitting, wherein said mounting joint has a first orientation aligned with said longitudinal axis and a second orientation rotated askew from said longitudinal axis, and wherein said distal arm has a laterally projecting tab; and
a linear transmission extending within said tube with a first end connected to said lever and a second end connected to said mounting joint, wherein said lever forces said linear transmission to move along said longitudinal axis from a first position corresponding with said resting position of said lever to a second position corresponding with said actuated position of said lever, wherein said mounting joint is in said first orientation when said linear transmission is in said first position and wherein said mounting joint is forced to said second orientation when said linear transmission is moved to said second position.

2. The cleaning tool of claim 1, wherein said linear transmission is comprised of a rod.

3. The cleaning tool of claim 2, wherein said linear transmission is further comprised of a spring and a stop, wherein said spring surrounds said rod within said tube at said proximal end, wherein said stop is fixedly connected to said rod and holds said spring against a proximal flange at said proximal end of said tube, and wherein said spring biases said lever to said resting position.

4. The cleaning tool of claim 1, wherein the basket is comprised of a grid, a rim and a basket fitting, wherein said basket fitting comprises an aperture extending through said basket fitting from a top side to a bottom side and a recess in said bottom side of said basket fitting, wherein said recess is adjacent to said aperture and defines a locking section of said basket fitting, wherein said aperture is comprised of a bore and at least one slot, wherein said distal arm and said laterally projecting tab respectively extend through said bore and said slot in an aligned orientation, and wherein said laterally projecting tab is rotated into said recess in a locked orientation.

5. The cleaning tool of claim 4, wherein said shoulder section of said mounting joint is comprised of a pair of opposing sidewalls, a support wall extending between said opposing sidewalls, an end wall extending between said opposing sidewalls and connected to said support wall along one side, and a pair of open sides opposite to said support wall and said end wall, wherein said distal arm extends from said end wall, wherein said laterally projecting tab is spaced from said end wall by a distance, and wherein said locking section in said basket fitting is situated between said laterally projecting tab and said end wall when said laterally extending tab is in said locked orientation.

6. The cleaning tool of claim 5, wherein said pivot assembly is further comprised of a pivot pin rotatably connecting said mounting joint to said tube fitting around an axis of rotation of said pivot pin.

7. The cleaning tool of claim 6, wherein said pivot pin has a circular end, a circular center and a semicircular end, wherein one of said sidewalls in said shoulder section has a circular hole corresponding with said circular end of said pivot pin and wherein another of said sidewalls has a semicircular hole corresponding with said semicircular end of said pivot pin, wherein said tube fitting is further comprised of a cylindrical section, a flange section and an arch section, wherein said cylindrical section fits around said distal end of said tube, wherein said flange section is buttressed against said distal end of said tube, wherein said arch section has a pair of faceplates with a circular orifice extending through each of said faceplates, wherein said faceplates of said arch section are located between said opposing sidewalls with said circular orifice in alignment with said circular hole and said semicircular hole, and wherein said circular end and said circular center of said pivot pin is positioned in said circular orifice and said circular hole and wherein said semicircular end of said pivot pin is positioned in said semicircular orifice.

8. The cleaning tool of claim 6, wherein said pivot assembly is further comprised of a torque clip connected to said pivot pin at one end and connected to said linear transmission at an opposite end, wherein said torque clip extends substantially perpendicular to said axis of rotation of said pivot pin.

9. The cleaning tool of claim 8, wherein said pivot assembly is further comprised of a set screw, wherein said pivot pin is further comprised of a center hole extending perpendicular to said axis of rotation and an internal threaded hole extending from one side of said pivot pin along said axis of rotation to an intersection with said center hole, wherein said torque clip extends through said center hole, and wherein said set screw is inserted into said internal threaded hole and engages said torque clip at said intersection of said internal threaded hole and said center hole.

10. The cleaning tool of claim 1, wherein said distal arm extends beyond said laterally projecting tab to a distal end hook.

11. A cleaning tool for a skimmer basket, comprising:
a handle comprising a grip and a lever, wherein said lever has a resting position and an actuated position;
a tube connected to said handle at a proximal end and extending from said proximal end to a distal end along a longitudinal axis;
a pivot assembly comprising a tube fitting and a mounting joint, wherein said tube fitting is fixedly connected to said distal end of said tube, wherein said mounting joint is rotatably connected to said tube fitting around an axis of rotation, wherein said mounting joint is comprised of a shoulder section and a distal arm longitudinally extending from said shoulder section away from said tube fitting, and wherein said mounting joint has a first orientation aligned with said longitudinal axis and a second orientation rotated askew from said longitudinal axis;
a linear transmission extending within said tube with a first end connected to said lever and a second end connected to said mounting joint, wherein said lever forces said linear transmission to move along said longitudinal axis from a first position corresponding with said resting position of said lever to a second position corresponding with said actuated position of said lever, wherein said mounting joint is in said first orientation when said linear transmission is in said first position and wherein said mounting joint is forced to said second orientation when said linear transmission is moved to said second position; and a means for connecting said mounting joint to the basket with a temporary connection, wherein said connecting means is comprised of a tab, wherein said tab laterally projects from said distal arm of said mounting joint into a plane perpendicular to said axis of rotation, and wherein said tab is substantially perpendicular to said longitudinal axis of said tube when said mounting joint is in said first orientation.

12. The cleaning tool of claim 11, wherein said pivot assembly is further comprised of a pivot pin rotatably connecting said mounting joint to said tube fitting around an axis of rotation of said pivot pin.

13. The cleaning tool of claim 11, wherein the basket is comprised of a grid and a rim, wherein said distal arm extends beyond said laterally projecting tab to a distal end hook, and wherein said hook connects to the basket through at least one of the grid and the rim.

14. The cleaning tool of claim 13, wherein the basket is further comprised of a basket fitting, wherein said basket fitting comprises an aperture extending through said basket fitting from a top side to a bottom side and a recess in said bottom side of said basket fitting, wherein said recess is adjacent to said aperture, wherein said aperture is comprised of a bore and at least one slot, wherein said distal arm and said tab respectively extend through said bore and said slot in an aligned orientation, and wherein said tab is rotated into said recess in a locked orientation.

15. The cleaning tool of claim 11, wherein said linear transmission is comprised of a rod.

16. A cleaning tool for a skimmer basket having a grid, a rim and a basket fitting, comprising:

a handle comprising a grip and a lever, wherein said lever has a resting position and an actuated position;

a tube connected to said handle at a proximal end and extending from said proximal end to a distal end along a longitudinal axis;

a pivot assembly comprising a tube fitting and a mounting joint, wherein said tube fitting is fixedly connected to said distal end of said tube, wherein said mounting joint is rotatably connected to said tube fitting and releasably connected to the basket through at least one of the basket fitting, the rim and the grid, wherein mounting joint has a first orientation aligned with said longitudinal axis and a second orientation rotated askew from said longitudinal axis; and a linear transmission extending within said tube with a first end connected to said lever and a second end connected to said mounting joint, wherein said lever translates said linear transmission within said tube along said longitudinal axis from a first position corresponding with said resting position of said lever to a second position corresponding with said actuated position of said lever, wherein said mounting joint is in said first orientation when said linear transmission is in said first position and wherein said mounting joint is forced to said second orientation when said linear transmission is moved to said second position.

17. The cleaning tool of claim 16, wherein said mounting joint is comprised of a shoulder section and a distal arm longitudinally extending from said shoulder section away from said tube fitting, wherein said distal arm has a laterally projecting tab, wherein the basket fitting comprises an aperture extending through the basket fitting from a top side to a bottom side and a recess in said bottom side of the basket fitting, wherein said recess is adjacent to said aperture, wherein said aperture is comprised of a bore and a pair of slots on opposite sides of said bore, wherein said distal arm and said laterally extending tab respectively extend through said bore and said slot in an aligned orientation, and wherein said laterally extending tab is rotated into said recess in a locked orientation.

18. The cleaning tool of claim 16, wherein said distal arm extends beyond said laterally projecting tab to a distal end hook, and wherein said hook releasably connects to the basket through at least one of the grid and the rim.

19. The cleaning tool of claim 16, wherein said linear transmission is comprised of a rod, a spring and a stop, wherein said spring surrounds said rod within said tube at said proximal end, wherein said stop is fixedly connected to said rod and holds said spring against a flange at said proximal end of said tube, and wherein said spring biases said lever to said resting position.

20. The cleaning tool of claim 16, wherein said pivot assembly is further comprised of a pivot pin rotatably connecting said mounting joint to said tube fitting around an axis of rotation of said pivot pin.

* * * * *